(12) United States Patent
Thomas

(10) Patent No.: US 6,801,672 B1
(45) Date of Patent: Oct. 5, 2004

(54) REMOVING NOISE FROM A COLOR IMAGE USING WAVELETS

(76) Inventor: Bruce A. Thomas, 540 Dufor St., Santa Cruz, CA (US) 95060

( * ) Notice: Subject to any disclaimer, the term of this patent is extended or adjusted under 35 U.S.C. 154(b) by 648 days.

(21) Appl. No.: 09/872,290

(22) Filed: Jun. 1, 2001

(51) Int. Cl.$^7$ .............................. G06K 9/40; G06K 9/00
(52) U.S. Cl. ........................ 382/275; 382/260; 382/167
(58) Field of Search ................................ 382/162, 164, 382/166, 167, 191, 240, 254, 260, 266, 267, 275; 375/240.19, 240.21, 240.27, 240.29; 358/501, 518, 523, 530

(56) References Cited

U.S. PATENT DOCUMENTS

| | | | | |
|---|---|---|---|---|
| 5,892,850 | A | * | 4/1999 | Tsuruoka ..................... 382/240 |
| 6,002,794 | A | * | 12/1999 | Bonneau et al. ............ 382/166 |
| 6,075,886 | A | * | 6/2000 | de Queiroz ................. 382/164 |
| 6,125,201 | A | * | 9/2000 | Zador ......................... 382/166 |
| 6,195,456 | B1 | * | 2/2001 | Balasubramanian et al. ..... 382/167 |
| 6,360,021 | B1 | * | 3/2002 | McCarthy et al. .......... 382/254 |
| 6,614,847 | B1 | * | 9/2003 | Das et al. .............. 375/240.16 |
| 6,711,299 | B2 | * | 3/2004 | Chao et al. ................. 382/240 |

OTHER PUBLICATIONS

J. Canny, "A Computational Approach to Edge Detection", *IEEE Transactions on Pattern Anaylsis and Machine Intelligence*, vol. PAMI–8, pp. 679–698, Nov. 1986.

S. Mallat, "Multifrequency Channel Decompositions of Images and Wavelet Models" *IEEE Transactions on Acoustics, Speech, and Signal Processing*, vol. 37, pp. 2091–2110, Dec. 1989.

M. Antonini et al., "Image Coding Using Wavelet Transform", *IEEE Transactions on Image Processing*, vol. 1, No. 2, pp. 205–220, Apr. 1992.

S. Mallat et al., "Characterization of Signals from Multiscale Edges", *IEEE Transactions on Pattern and Machine Intelligenge*, vol. PAMI–14, pp. 710–732, Jul. 1992.

B. Thomas, "New Aspects of Digital Color Image Enhancement", *Ph D. Dissertation submitted to Dept. of Electrical and Computer Engineering, University of Arizona*, 1999.

* cited by examiner

*Primary Examiner*—Andrew W. Johns
*Assistant Examiner*—Amir Alavi
(74) *Attorney, Agent, or Firm*—Sierra Patent Group, Ltd.

(57) ABSTRACT

A color image is enhanced by removing noise. A wavelet transform is applied to a color image to generate sets of wavelet transform coefficients for multiple channels. Edge maps are produced for the channels from the sets of wavelet transform coefficients. An edge likelihood map is generated based on at least one edge map. The edge likelihood map is applied to the sets of wavelet transform coefficients to generate sets of filtered wavelet transform coefficients. A de-noised color image is reconstructed from the sets of filtered wavelet transform coefficients.

35 Claims, 11 Drawing Sheets

Generating the Multiplicative Mask

LH1 /—372

$$\frac{2^j \; \partial(f*\theta_{2^j})(m,n)}{\partial m}$$

HL1 /—374

$$\frac{2^j \; \partial(f*\theta_{2^j})(m,n)}{\partial n}$$

Edge Map

REMOVING NOISE FROM A COLOR IMAGE USING WAVELETS

BACKGROUND OF THE INVENTION

The present invention relates generally to digital image processing, and particularly to a system and method for removing noise from color images using wavelets.

Digital color images are becoming a common part of every day life. This is due, in part, to the growing presence of desktop scanners, digital cameras, and digital video appliances in the consumer market. Desktop scanners, digital cameras, and digital video appliances are examples of tools that have greatly simplified the capture of digital color image information.

Tools that capture digital color image information predominantly use an electronic image sensor that senses an image. Typically the electronic image sensor is a solid-state device such as a charge-coupled device (CCD) or a complementary metal-oxide-semiconductor (CMOS) device. The image sensor connects to electronic interface circuitry which connects to a storage device and, optionally, to a display.

A typical electronic image sensor has many cells, also referred to as pixels, arranged along vertical and horizontal dimensions in a regular grid. These cells are sensitive to light intensities and convert incident light intensities to electrical signals which are subsequently represented in digital form. Electronic image sensors are made in many sizes such as, e.g. 400×300, 640×480, 1024×768, and 4096×4096 pixels.

The image information sensed by each cell is also called a pixel. For example, a 640×480 CCD has about 307,200 pixels. After being converted to digital form, the image information (image data) is stored in a memory, typically an image memory. Image sensors having larger number of cells produce higher quality images; however, more pixel information must be processed and stored.

Typically, a digital signal processor processes the digital image data to improve the quality of the image. Various algorithms well-known in the art are used to improve image quality. Because there is such a large amount of image data, the image data is often compressed before storage in a storage medium.

Color imaging increases the complexity of processing the digital image data. In one method, the image sensor has a geometric arrangement of cells to respond to three colors, e.g, red, green and blue. Since each cell senses a particular color, various algorithms are used to interpolate the missing color information. Alternatively, two or more image sensors having different color sensitivity can be used and the image information is combined.

Digital images are subject to degradations caused by thermal noise from the image sensor. In one method, a wavelet transform is used to remove noise from gray-scale images. However, color images have properties not found in gray-scale images. Therefore, a system and method that uses the properties of color images for color image enhancement is desirable. In particular, this method should reduce the amount of noise in a color image.

SUMMARY OF THE INVENTION

A color image is enhanced by removing noise. A wavelet transform is applied to a color image to generate sets of wavelet transform coefficients for multiple channels. Edge maps are produced for the channels from the sets of wavelet transform coefficients. An edge likelihood map is generated based on at least one edge map. The edge likelihood map is applied to the sets of wavelet transform coefficients to generate sets of filtered wavelet transform coefficients.

DESCRIPTION OF THE PREFERRED EMBODIMENTS

Persons of ordinary skill in the art will understand that the use of the term "chromatic" and its variants herein will refer to any form of color descriptor, including luminance information.

Figure 1:
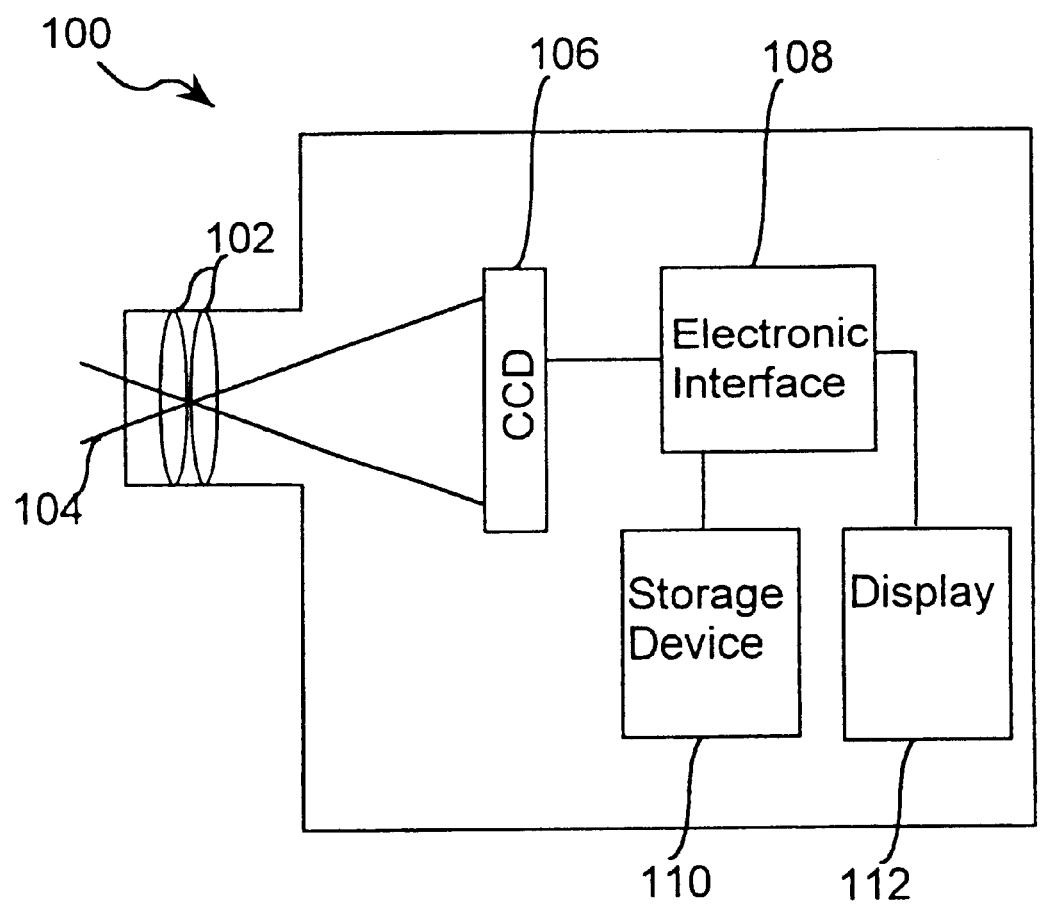
FIG. 1 is a block diagram of an electronic digital image capture device such as would benefit from the present invention.

FIG. 1 is a block diagram of a digital image capture device embodying the method for removing noise from color images of the present invention. A lens 102 transmits the image-forming light 104 onto an electronic image sensor (image sensor) 106. The image sensor 106 is built into the device and is located at the focal plane of the lens. The image sensor is typically a charge-coupled device (CCD) or a complementary metal-oxide-semiconductor (CMOS) sensor. Image sensors differ in the arrangement of the cells within the image sensor and the type of electronic readout. The image sensor 106 connects to electronic interface circuitry 108. The electronic interface circuitry 108 also connects to a storage device 110 and an optional display 112. The electronic interface circuitry 108 controls the storage device 110 to store the image sensed by the image sensor 106. The storage device 110 can include a tape drive, a disk drive, such as a floppy disk drive, hard disk drive, optical disk drive or magneto-optical disk drive, or an integrated circuit card with RAM or EEPROM. The storage device 100 can be inside the digital image capture device 100 or attached to the device externally. The electronic interface circuitry 108 can also control the optional display 112 to display the image sensed by the image sensor 106. The optional display 112 can be built into the digital image capture device or attached to the device externally. The electronic interface circuitry can operate the optional display 112 in either a viewfinder mode or a review, i.e. stored image viewing, mode.

Figure 2:
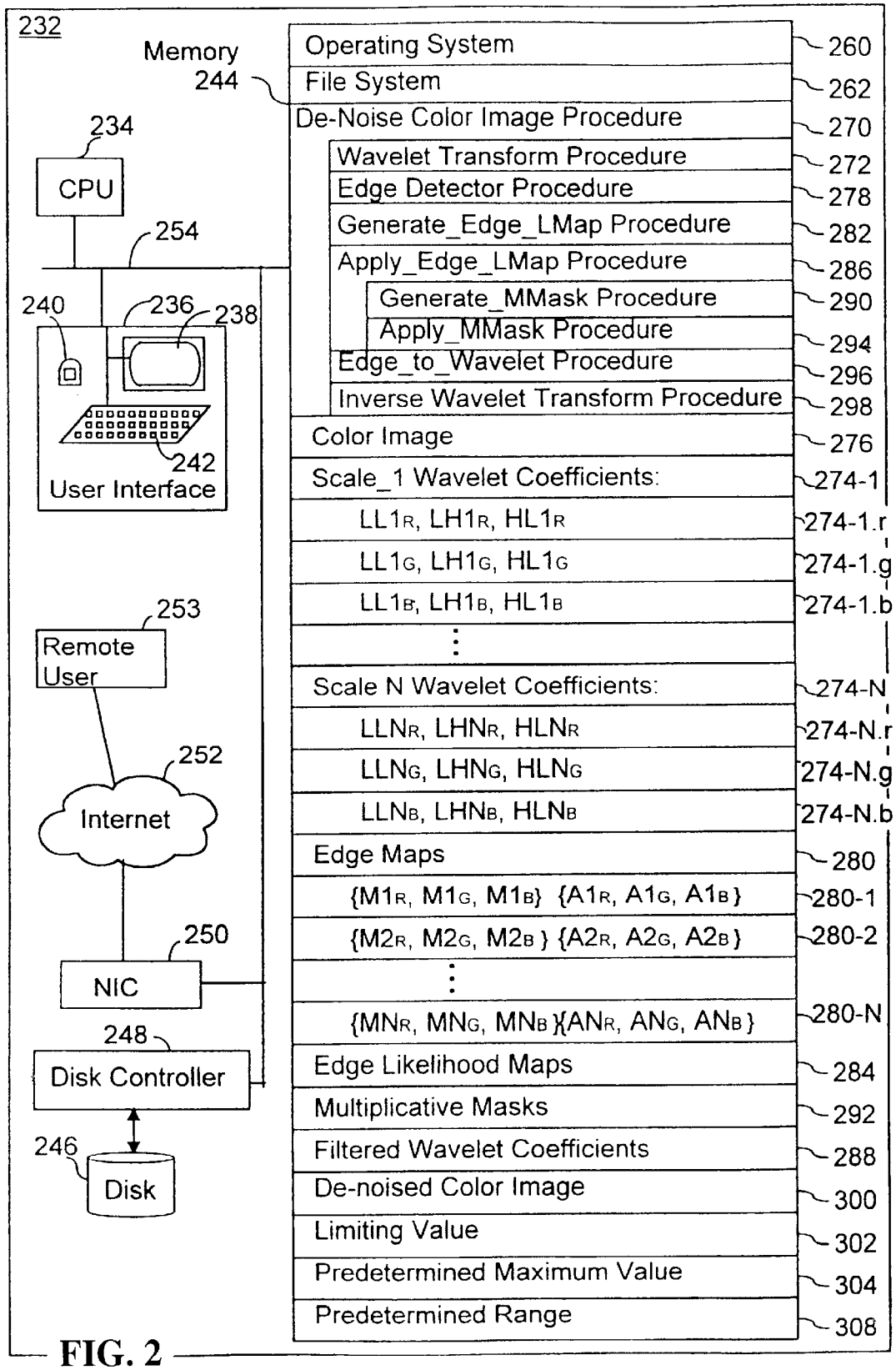
FIG. 2 is a block diagram of a computer system using the method for removing noise from color images of the present invention.

In FIG. 2, a computer system 232 implements the method of removing noise from color images of the present invention. The computer system 232 includes a data processor (CPU) 234, a user interface 236, including a display 238 and one or more input devices, such as a mouse 240 and a keyboard 242, memory 244, which may include random access memory as well as disk storage 246 and other storage media, a disk drive 246 storing programs and data, the disk drive 246 may be a hard disk drive, a floppy disk drive or an optical disk drive, a disk controller 248 that provides an interface to the disk drive 246, a network interface card (NIC) 250 for connecting to client computers via the Internet 252 to allow a remote user 253 to access the de-noise image procedure of the present invention, and one or more buses 254 for interconnecting the aforementioned elements of the system.

The operation of the computer system 232 is controlled primarily by control programs that are executed by the system's processor 234. In a typical implementation, the programs stored in the system memory 244 include an operating system 260 that includes procedures for handling various basic system services and for performing hardware dependent tasks; the operating system 260 may include a set of user interface procedures for handling input received from the user interface 236 and displaying the output to the user on the display 238, a file system 262 for storing, updating, and managing files on any of the storage devices, and a de-noise color image procedure 270 that removes noise from color image in accordance with the present invention.

The de-noise color image procedure 270 includes a set of procedures. Specific embodiments of the de-noise color image procedure 270 will be described below with reference to FIGS. 3, 4, 9, 10, 11, and 12. The various procedures of the de-noise color image procedure 270 include a wavelet transform procedure 272 that generates sets of wavelet transform coefficients 274 from the sample values of a color image 276, an edge detector procedure 278 that generates sets of edge maps 280 from the sets of wavelet transform coefficients 274, a Generate_Edge_LMap procedure 282 that generates one or more edge likelihood maps 284 based on the edge maps 280, an Apply_Edge_LMap procedure 286 that, in one embodiment, applies the edge likelihood maps 284 to at least a subset of the edge maps 280 to generate filtered edge maps, and in an alternate embodiment, applies the edge likelihood maps 284 directly to at least a subset of the wavelet transform coefficients 274 of the color image 276 to generate filtered wavelet coefficients 288; In another alternate embodiment, the Apply_Edge_LMap procedure 286 generates and applies one or more multiplicative masks to at least a subset of edge maps, or alternately to at least a subset of the wavelet transform coefficients, a Generate_Mask procedure 290 that generates multiplicative masks 292 based on one or more edge likelihood maps, an Apply_MMask procedure 294 that, in one embodiment, applies the one or more multiplicative masks 292 to at least a subset of the edge maps 280 to generate filtered edge maps, and in an alternate embodiment, applies the one or more multiplicative masks 292 directly to at least a subset of the wavelet transform coefficients 274 of the color image 276 to generate filtered wavelet transform coefficients 288, an Edge_to_Wavelet Procedure 296 that produces sets of filtered wavelet coefficients 288 from filtered edge maps, and an inverse wavelet transform procedure 298 that reconstructs a de-noised color image 300 from the sets of filtered wavelet coefficients 288.

The memory 244 also stores the noisy color image's 276 sample values. In one embodiment, the sample values are in RGB format. In an alternate embodiment, the sample values are in YUV format. Alternately, the sample values are in YIQ format. In another alternate embodiment, the sample values represent luminance, saturation and hue.

The memory 244 also stores sets of wavelet transform coefficients 274. In one embodiment, each set of wavelet transform coefficients is associated with a particular scale. The Scale_1 wavelet coefficients 274-1 are associated with a first scale and include subsets of wavelet coefficient data 274-1.r, 274-1.g, and 274-1.b for each color channel. For the red channel, the subset 274-1.r of wavelet coefficients include the LL1R, LH1R and HL1R coefficients. For the green channel, the subset 274-1.g of wavelet coefficients include the LL1G, LH1G and HL1G coefficients. For the blue channel, the subset 274-1.b of wavelet coefficients include the LL1B, LH1B and HL1B coefficients. There may be up to N scales of sets of wavelet transform coefficients. The Scale_N wavelet coefficients 274-N include subsets of wavelet coefficients 274-N.r, 274-N.g, 274-N.b, for each color channel. In a preferred embodiment, two scales are used.

The memory 244 also stores sets of edge maps 280 include scale-specific subsets that are associated with the color channels at each scale. For instance, the subset of M1 and A1 edge map values 280-1 is associated with the wavelet transform coefficients at a first scale. The modulus images, M1R, M1G and M1B, store the magnitudes of scale 1 edges computed from red, green and blue wavelet coefficients, respectively. The angle images, A1R, A1G and A1B, store the angles of these same edges which are also computed from the red, green and blue wavelet coefficients at scale N.

The memory 244 also stores at least one edge likelihood map 284; one or more multiplicative masks 292; filtered edge maps; for simplicity the edge maps 280 include the filtered edge maps; sets of filtered wavelet coefficients 288; a denoised color image's 300 sample values; one or more limiting values 302 that are used, in some embodiments, to generate the multiplicative masks 292; one or more predetermined maximum values 304 that are used to generate the multiplicative masks 292; and one or more predetermined ranges 308 that are used to scale the edge likelihood maps 284 to generate the multiplicative masks 292.

The procedures and data of the memory 244 may also be stored on the disk drive 246.

The present invention removes noise from color images based on the correspondence of edges between color channels. The color channels of a color image tend to have edges that coincide. A greater percentage of coinciding edges occur at fine scales. The method of the present invention uses the edge information of the color channels to remove noise from a color image. As a result, the quality of the color image is enhanced.

A first embodiment of the present invention will be described with respect to FIGS. 3 and 4. Additional embodiments of the present invention will be described with respect to FIGS. 9, 10, 11, and 12.

Figure 3:
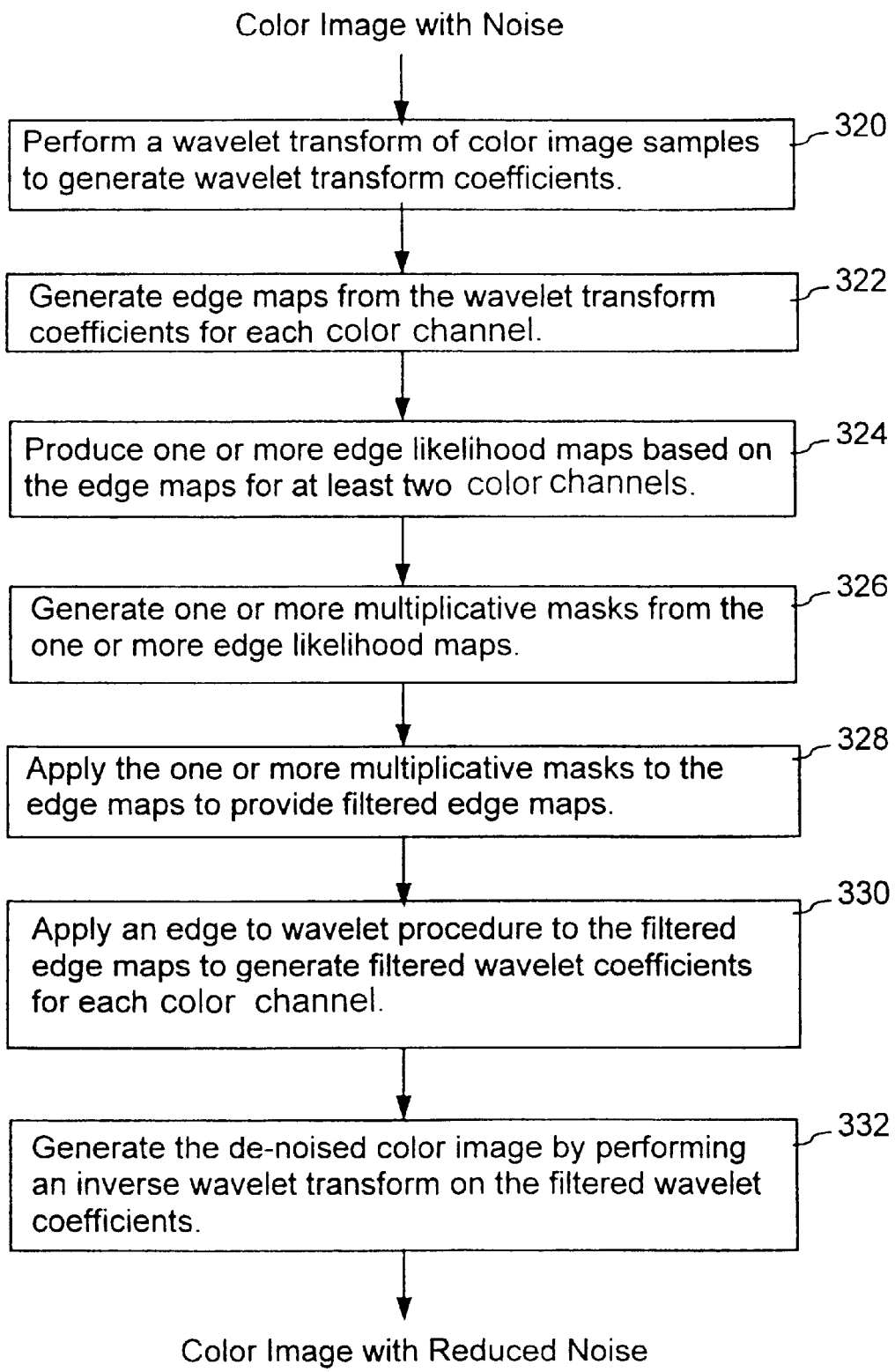
FIG. 3 is a flowchart of a de-noise color image procedure that implements the method for removing noise from color images of FIG. 2.

In FIG. 3, a flowchart of one embodiment of the de-noise color image procedure 270 (FIG. 2) is shown. This embodiment generates the multiplicative masks 292 (FIG. 2) from at least a subset of the edge maps 280 (FIG. 2) of at least two color channels, and applies the multiplicative masks 292 (FIG. 2) to at least a subset of the edge maps 280 (FIG. 2) to remove noise.

In step 320, the de-noise color image procedure 270 (FIG. 2) calls the wavelet transform procedure 272 (FIG. 2) to perform a wavelet transform of the color image sample values 276 (FIG. 2) to generate sets of wavelet transform coefficients 274 (FIG. 2). In step 322, the de-noise color image procedure 270 (FIG. 2) calls the Edge Detector procedure 278 (FIG. 2) to generate edge maps 280 (FIG. 2) from the wavelet transform coefficients 274 (FIG. 2) for each color channel.

In step 324, the de-noise color image procedure 270 (FIG. 2) calls the Generate_Edge_LMap procedure 282 (FIG. 2) to produce one or more edge likelihood 20 maps 284 (FIG. 2) based on at least a subset of the edge maps 280 (FIG. 2) for at least two distinct color channels. In a preferred embodiment, the color image 276 (FIG. 2) has three distinct color channels and one or more edge likelihood maps 284 (FIG. 2) are generated based on at least a subset of the edge maps of the three distinct color channels.

In step 326, the de-noise color image procedure 270 (FIG. 2) calls the Generate_MMask procedure 290 (FIG. 2) to generate one or more multiplicative masks 292 (FIG. 2) from the one or more edge likelihood maps 284 (FIG. 2). The multiplicative mask(s) 292 (FIG. 2) are used to remove noise from the color image 276 (FIG. 2).

In step 328, the de-noise color image procedure 270 (FIG. 2) calls the Apply_MMask procedure 294 (FIG. 2) to apply one or more multiplicative masks 292 (FIG. 2) to at least a subset of the edge maps 280 (FIG. 2) to provide at least a subset of filtered edge maps. Depending on the implementation, some edge maps may not be altered.

In step 330, the de-noise color image procedure 270 (FIG. 2) applies the Edge_to_Wavelet procedure 296 (FIG. 2) to edge maps, including the filtered edge maps, to generate the filtered wavelet coefficients 288 (FIG. 2) for each color channel.

In step 332, the de-noise color image procedure 270 (FIG. 2) calls the inverse wavelet transform procedure 298 (FIG. 2) to generate the de-noised color image's 300 (FIG. 2) sample values by performing an inverse wavelet transform on the filtered wavelet coefficients 288 (FIG. 2). In this description, the "filtered wavelet coefficients" refer to a complete set of wavelet coefficients that includes the filtered or altered coefficients and possibly unaltered coefficients, so as to form a complete set of wavelet coefficients for reconstruction.

Figure 4:
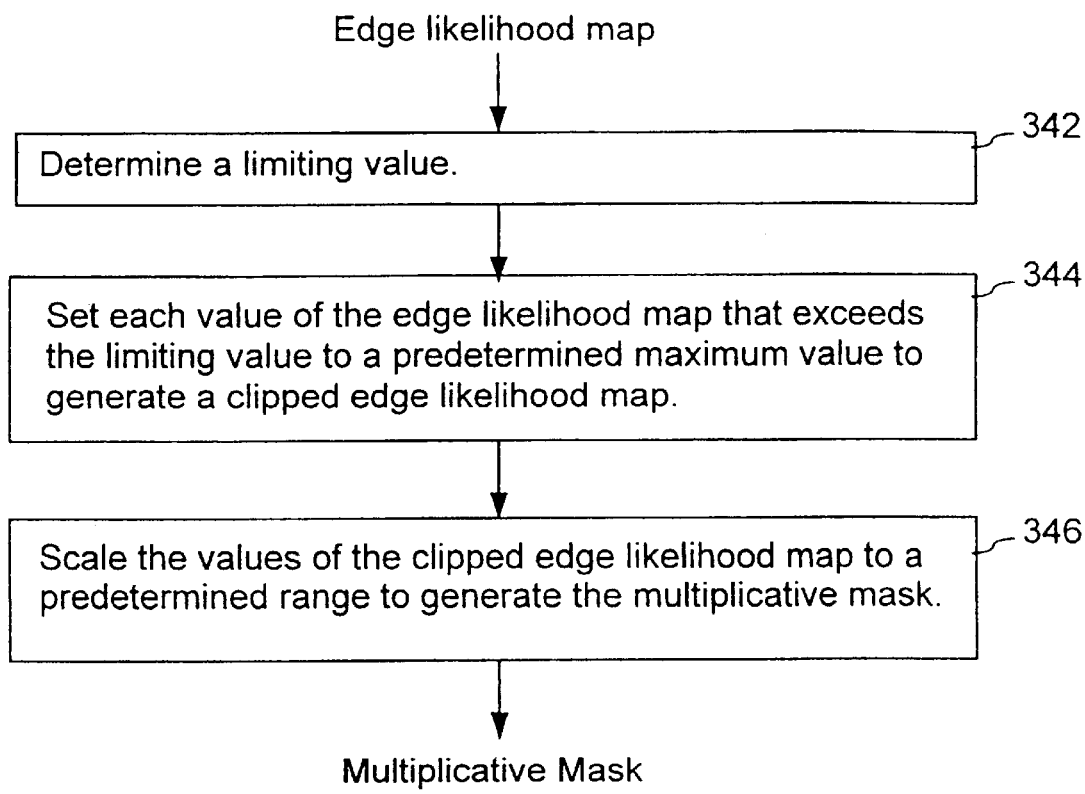
FIG. 4 is a detailed flowchart of a method of generating a multiplicative mask of the flowchart of FIG. 3.

FIG. 4 shows step 326 of FIG. 3, which generates one or more multiplicative masks, in further detail. In step 342, the Generate_MMask procedure 290 (FIG. 2) determines the limiting value 302 (FIG. 2) based on the values of an edge likelihood map. The limiting value 302 (FIG. 2) is that value which when exceeded triggers a clipping operation which sets the corresponding datum to a predetermined maximum value 304 (FIG. 2). In one embodiment, the predetermined maximum value 304 (FIG. 2) is equal to the limiting value 302 (FIG. 2). In an alternate embodiment, the predetermined maximum value 304 (FIG. 2) is set to a value other than the liming value 302 (FIG. 2).

In step 344, each value of the edge likelihood map 284 (FIG. 2) that exceeds the limiting value 302 (FIG. 2) is set equal to the predetermined maximum value 304 (FIG. 2) to generate a clipped edge likelihood map. For example, this "clipping" operation may be mathematically described as follows: $g_T(x) = MIN(x, T)$, where x is an input datum, and T is the limiting value.

In step 346, the values of the clipped edge likelihood map are scaled to a predetermined range to generate the multiplicative mask 292 (FIG. 2). In an alternate embodiment, prior to step 346, a very small DC bias, such as 0.001, is added to the edge-likelihood map to avoid producing zero-valued mask entries, thus providing a simpler implementation.

Before describing the steps of FIGS. 3 and 4 in further detail, it is important to briefly explain color spaces. The invention is not limited to use with a particular color space and may be used with any color space.

Color Spaces

Figure 5:
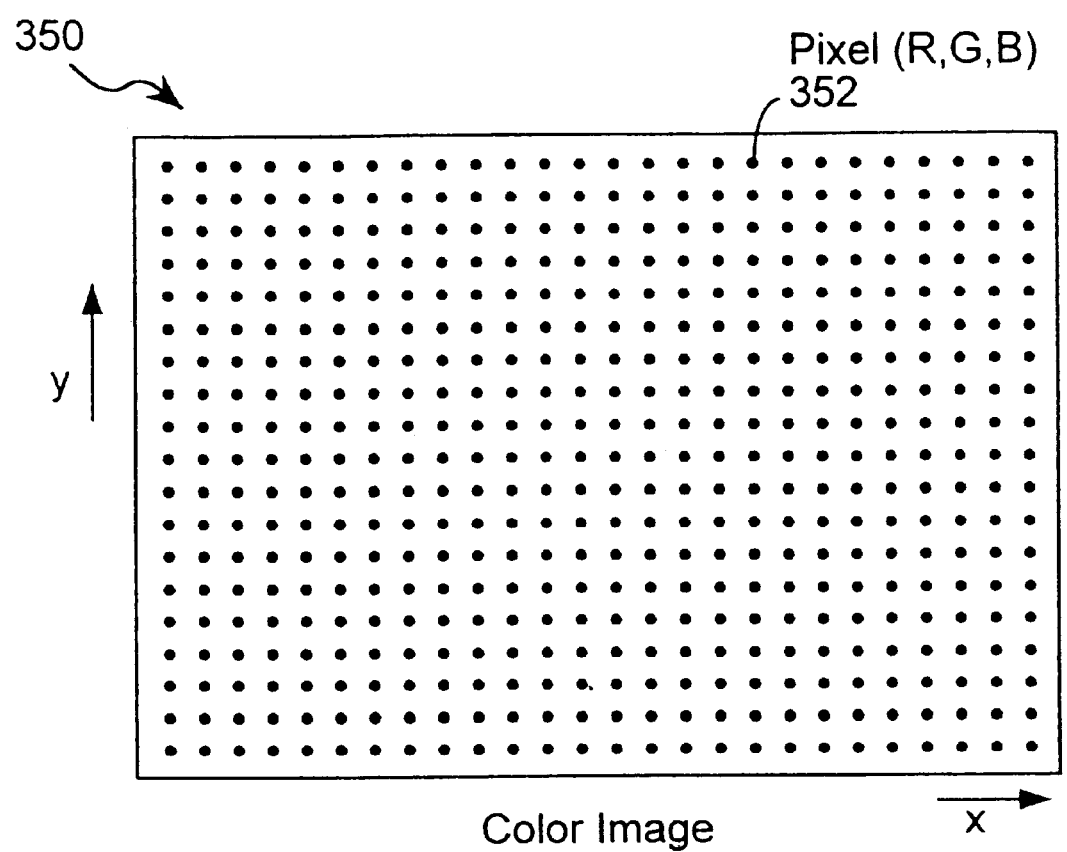
FIG. 5 is a diagram of a color image showing the color image sample values of FIG. 2.

Referring to FIG. 5, a two-dimensional array of pixels 350 is shown. Each pixel 352 is associated with a set of sample values with color space information, and with spatial indices, such as an x-y coordinate. Color image data may be described using a variety of color spaces. In one embodiment, a red-green-blue (RGB) color space is used. Each sample value is a tuple of color image data for a pixel which describes the red-green-blue (RGB) content of the pixel. Alternately, using another color space, each sample value is a tuple of color image data for a pixel which provides luminance and color difference (e.g., YUV or YIQ) descriptors of the pixel's color. By applying a color-space transform, the RGB values may be represented as YUV or YIQ values. An inverse color-space transform converts YUV or YIQ values to RGB value. A color channel refers to any of the red, green and blue channels, or Y, U, V, or Y, I, Q channels depending on the color space. In another alternate embodiment, the color space is defined in terms of luminance, saturation and hue channels; and a color channel includes any of the luminance, saturation and hue channels.

Wavelet Transform

Figure 6:
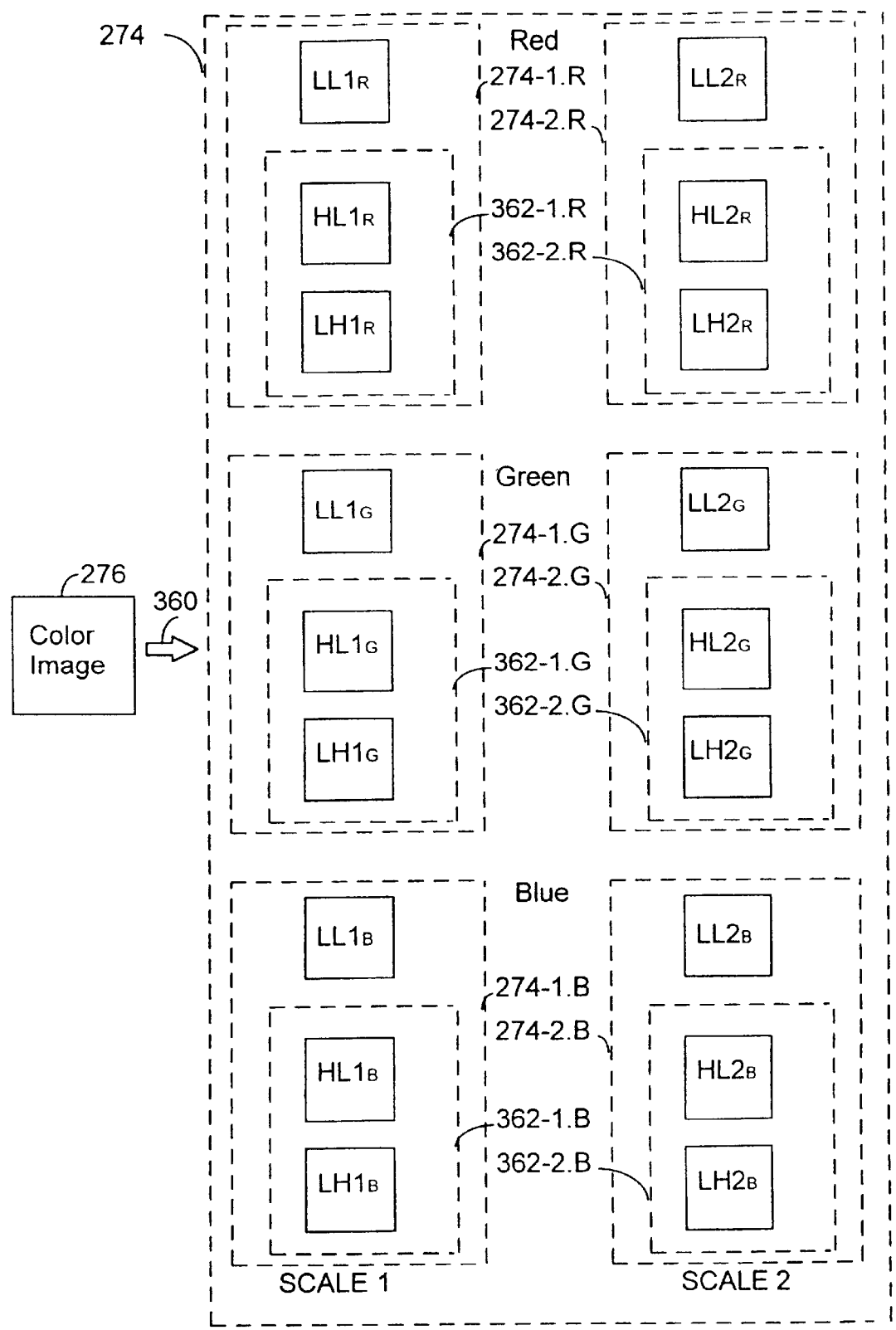
FIG. 6 is a diagram of one embodiment of generating sets of multi-scale wavelet coefficients for multiple color channels of FIG. 2.

Referring to FIGS. 2 and 6, sets of wavelet coefficients resulting from the application of a wavelet transform of the wavelet transform procedure 272 (FIG. 2) are shown. In this embodiment, the wavelet transform is an undecimated wavelet transform that generates sets of wavelet coefficients for each color channel, such as red, green and blue, at specified scales. In a preferred embodiment two scales are used. In an alternate embodiment, any number N of scales are used.

In a preferred embodiment, the wavelet transform belongs to a class of wavelets which compute derivatives of smoothed versions of the input signal, as taught by S. Mallat and S. Zhong in "Characterization of signals from multiscale edges," IEEE Transactions on Pattern and Machine Intelligence, vol. PAMI-14, pp. 710–732, July 1992 (hereinafter also referred to as Mallat-Zhong). For two-dimensional signals, such as shown in FIG. 5, partial derivatives are computed for the sample values at each scale, s, resulting in the following horizontal and vertical wavelet transform subbands:

$$W_s^H f(x, y) = s \frac{\partial}{\partial x}(f * \theta_s)(x, y)$$

$$W_s^V f(x, y) = s \frac{\partial}{\partial y}(f * \theta_s)(x, y)$$

where $$\theta_s = \left(\frac{1}{s^2}\right) \theta\left(\frac{x}{s}, \frac{y}{s}\right)$$

is a dilated version of a smoothing function $\theta(x,y)$. The partial derivatives $W_s^H f(x,y)$ and $W_s^V f(x,y)$ are subsequently combined to form gradient vectors which are used to locate edges at a particular scale, S.

Rewriting the above equations in discrete form results in the following relationships:

$$W_{2^j}^H f(m, n) = 2^j \frac{\partial}{\partial m}(f * \theta_{2^j})(m, n)$$

-continued $$W_{2^j}^V f(m, n) = 2^j \frac{\partial}{\partial n} (f * \theta_{2^j})(m, n)$$

where $$\theta_{2^j} = \left(\frac{1}{(2^j)^2}\right) \theta\left(\frac{m}{2^j}, \frac{n}{2^j}\right)$$

is a dilated version of a smoothing function θ(m,n). The partial derivatives $W_{2^j}^H f(m,n)$ and $W_{2^j}^V f(m,n)$ are subsequently combined to form gradient vectors which are used to locate edges at a particular scale $S=2^j$.

Mallat and Zhong have formulated an efficient, discrete implementation of this wavelet transform, the details of which can be found in appendices A and D of Mallat-Zhong, i.e. in "Characterization of signals from multiscale edges," IEEE Transactions on Pattern and Machine Intelligence, vol. PAMI-14, pp. 710–732, July 1992. The discrete implementation of Mallat and Zhong uses a bank of upsampled digital filters to compute horizontal and vertical wavelet subbands at dyadic scales of analysis, i.e. $S=2^j$, $1 \leq j \leq \log_2(N)$. N is the smaller of the input image's pixel dimensions.

In FIG. 6, the sets of wavelet coefficients for two scales are shown. After performing the wavelet transform as taught by Mallat-Zhong, as indicated by arrow 360, the sets of wavelet coefficients 274 are generated for each color channel at each scale. For each color channel at the first scale, the associated sets of wavelet coefficients include: LL1, LH1 and HL1 coefficients. For each color channel at the second scale, the associated sets of wavelet coefficients include: LL2, LH2 and HL2 coefficients. Each set of wavelet coefficients has the same number of coefficients as in the source color image.

The sets of the wavelet coefficients that correspond to the above relationships are as follows: LH1 represents $W_{2^1}^H f$(m,n), HL1 represents $W_{2^1}^V f$(m,n) for color channel f(m,n) at the first scale, LH2 represents $W_{2^2}^H f$(m,n) and HL2 represents $W_{2^2}^V f$(m,n) for color channel f(m,n) at the second scale. The small R, G or B labels following HL1, HL2, LH1 and LH2 serve to designate the specific color channel involved, namely, R(m,n), G(m,n) and B(m,n) respectively. The LL subbands are low pass coarse images and typically remain unchanged during the denoising process. An LL subband is generated for each color channel for each scale. In one implementation, only one LL subband is retained for each color channel, i.e. the LL subband corresponding to the highest scale in each color channel's wavelet decomposition. Each color channel's LH, HL, and LL subbands have the same pixel dimensions as the noisy color image. Alternate embodiments may have LL, HL and LH subbands that have pixel dimensions that differ from those of the noisy color image. The dashed boxes 362 indicate that the HL and LH subbands are used to generate the edge-likelihood maps.

Figures 7, 8:
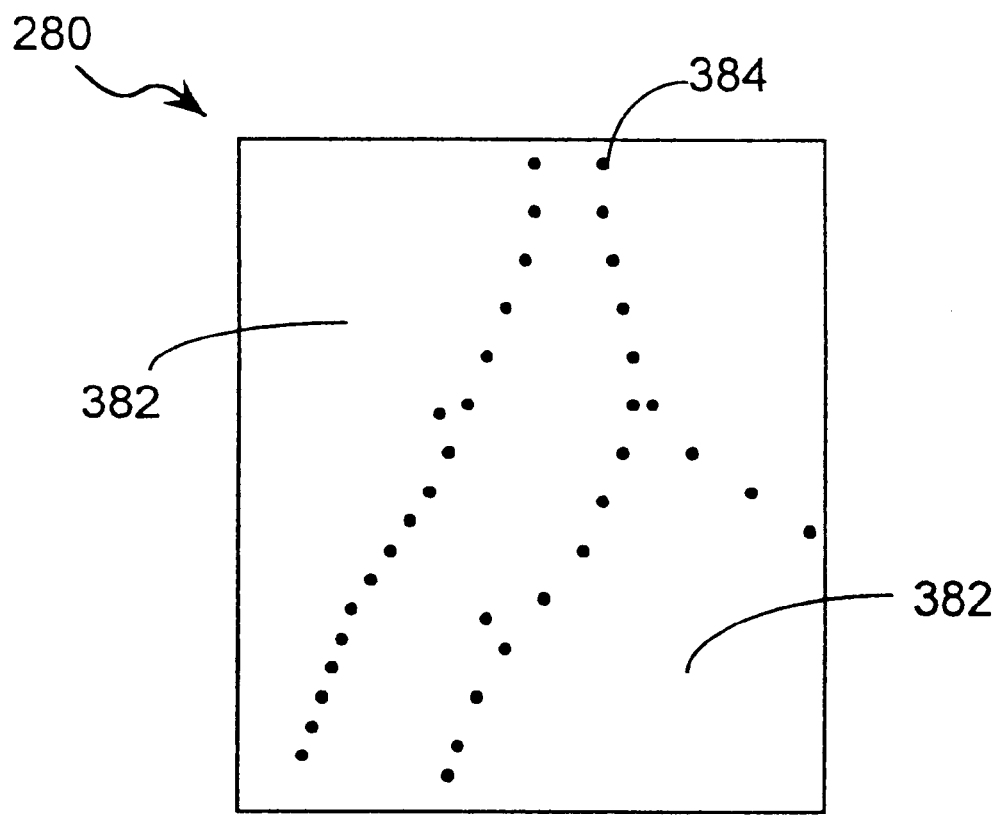
FIG. 7 is a diagram that further illustrates the complementary subsets of a set of multi-scale wavelet coefficients that are used to generate an edge map of FIG. 6.
FIG. 8 is a diagram of an exemplary edge map produced by an edge detector of FIG. 2.

In FIG. 7, the LH and HL coefficients are represented by partial derivatives in blocks 372 and 374, respectively.

In an alternate embodiment, a decimated wavelet transform is used. A first application of the decimated wavelet transform to an initial two dimensional array of image data generates four sets of coefficients: labelled LL1, HL1, LH1 and HH1. Each succeeding application of the wavelet transform is applied only to the LL set of coefficients generated by the previous wavelet transformation step and generates four new sets of coefficients, called LLx, HLx, LHx and HHx, where x represents the wavelet transform iteration or scale. After the last wavelet transform iteration, only one LL set remains. The total number of generated coefficients is equal to the number of pixels in the original array of image data. The different sets of coefficients are called subbands.

An example of a decimated wavelet transform is described by M. Antonini, M. Barlaud, P. Mathieu, and I. Daubechies in "Image coding using wavelet transform," IEEE Transactions on Image Processing, Vol. 1, No. 2 (April 1992), pp. 205–220.

Other wavelet transforms include octave-tree subband decomposition, partial tree decomposition, wavelet packets as well as separable and non-separable wavelet decompositions. A separable wavelet decomposition is described by M. Antonini, M. Barlaud, P. Mathieu, and I. Daubechies in "Image Coding Using Wavelet Transform," IEEE Transactions on Image Processing, Vol. 1, No. 2 (April 1992), pp. 205–220.

Detecting Edges

The edge detector procedure 278 (FIG. 2) generates sets of edge maps 280 (FIG. 2) for each color value at each scale from the HL and LH sets of coefficients or subbands at each scale. Edges are located at points where the modulus (magnitude) of the gradient vector is maximum along a line pointing in the direction of the gradient. This method of edge detection is equivalent to Canny edge detection, as taught by J. Canny, in "A computational approach to edge detection," IEEE Transactions on Pattern Analysis and Machine Intelligence, vol. PAMI-8, pp. 679–698, Nov. 1986, when θ(x,y) is a Gaussian. The edge detector used in one embodiment of the present invention is described by S. Mallat and S. Zhong in "Characterization of signals from multiscale edges, IEEE Transactions on Pattern and Machine Intelligence, vol. PAMI-14, pp. 710–732, July 1992. Spatially sampled versions of the edge gradient modulus (magnitude) and angle are determined from the resulting wavelet coefficients, for each corresponding pixel location (designated as m and n for the horizontal and vertical locations, respectively), as taught by Mallat-Zhong using the following relationships:

$$M_{2^j} f(m, n) = \sqrt{|W_{2^j}^H f(m, n)|^2 + |W_{2^j}^V f(m, n)|^2}$$

$$A_{2^j} f(m, n) = \arctan\left|\frac{W_{2^j}^V f(m, n)}{W_{2^j}^H f(m, n)}\right|$$

This leads to a wavelet-transform-modulus-maxima (WTMM) representation which records the position, (m,n), magnitude, $M_{2^j}f$(m,n), and angle, $A_{2^j}f$(m,n), of the modulus maxima along with at least one coarse image, $S_{2^j}f$(m,n) (the LL coefficients of FIGS. 2 and 6). The upper case J represents the maximum possible value that lower case j can take, i.e., $J=\log_2(N)$, where N is the smaller of the input color image's pixel dimensions. The coarse image is the low-pass residual image produced by the digital filter bank that is used to implement the wavelet transform. Digital filter banks that are used to implement wavelet transforms are described by S. G. Mallat in "Multifrequency channel decomposition of images and wavelet models," IEEE Transactions on Acoustics, Speech and Signal Processing, Vol. 37, pp. 2091–2110 (December 1989).

The multiscale edge maps of the R, G and B components, at one scale, are described using three sets of wavelet transform modulus maxima (WTMM) data or values. The sets of data include both modulus images which store edge magnitude values, $M_{2^j}f$(m,n), and angle images which store angle values, $A_{2^j}f$(m,n). Modulus images and angle images are generated for each color channel, red, green and blue, and are labelled $M_{2^j}R$(m,n) and $A_{2^j}R$(m, n), $M_{2^j}G$(m,n) and $A_{2^j}G$(m,n), and $M_{2^j}B$(m,n) and $A_{2^j}B$(m,n), respectively. FIG. 2 designates the edge maps as M1R, M2R, . . . MNR for the modulus images, and as A1R, A2R, . . . ANR for the angle images. The correspondence of the edge maps of FIG. 2 is as follows: M1R corresponds to $M_2{}^1R(m,n)$, M2R corresponds to $M_2{}^2R(m,n)$, MNR corresponds to $M_2{}^NR(m,n)$, A1R corresponds to $A_2{}^1R(m,n)$, A2R corresponds to $A_2{}^2R(m,n)$, and ANR corresponds to $A_2{}^NR(m,n)$.

Edges within an edge map can be described in terms of both magnitude (modulus) values and angle values. In a preferred embodiment, magnitude values alone are used. In an alternate embodiment, angle values alone are used. In yet another embodiment, both magnitude and angle values are used.

Producing an Edge Likelihood Map

FIG. 8 shows the footprint of a sample edge map 280. The blank portions 382 of FIG. 8 correspond to locations where no edge is present, while the dots 384 identify locations having non-zero value, and thus demark the location of an edge. The particular magnitude value associated with each dot 384 is not shown. The magnitude values of the edge map 280, which comprises the modulus image $M_2 f(m,n)$, have a zero value 382 at pixel locations where there is no edge, and edge magnitude values 384 at all other pixel locations.

The angle values of the edge map 280 are stored in the angle images, referred to as $A_2 j R(m,n)$, $A_2 j G(m,n)$ and $A_2 j B(m,n)$, for the red, green and blue components, respectively. The angle images have undefined pixel values at locations where there is no edge, and defined edge angle values at all other locations. Alternately, the dots 384 of FIG. 8 represent the pixel locations where edge angle values are defined. The particular angle value associated with each dot is not shown.

In a preferred embodiment, one or more edge likelihood maps 284 are generated from at least a subset of the edge magnitude values of the modulus images. In an alternate embodiment, one or more edge likelihood maps 284 are generated from at least a subset of the edge angle values of the angle images. In another alternate embodiment, one or more edge likelihood maps are generated from the combination of at least a subset of edge magnitude values of the modulus images and at least a subset of the angle values of the angle images.

For the sets of wavelet coefficients shown in FIG. 6, six edge maps are generated. This yields a set of three modulus images $M_2{}^1R(m,n)$, $M_2{}^1G(m,n)$ and $M_2{}^1B(m,n)$, one for each of the red, green and blue color channels, respectively, which correspond to the first scale. Another set of three modulus images $M_2{}^2R(m,n)$, $M_2{}^2G(m,n)$ and $M_2{}^2B(m,n)$, one for each of the red, green and blue color values, respectively, are generated for the second scale. The scale is designated with a lower case "j." For the first scale, the value of j is set equal to one; for the second scale, the value of j is set equal to two.

Generating A Multiplicative Mask

In a preferred embodiment, one or more multiplicative masks, $k_2 j(m,n)$ are generated from the edge likelihood maps which are based on the modulus images, $M_2 j R(m,n)$, $M_2 j G(m,n)$ and $M_2 j B(m,n)$. These multiplicative masks are applied to at least a subset of color channel edge maps to denoise color images. One or more multiplicative masks are generated so that locations having physically significant edges are not altered during masking, while other edges are suppressed in direct proportion to their "edge likelihood." In one embodiment, physically significant edges are not altered during masking while other edges are suppressed.

Referring back to FIGS. 3 and 4, in one embodiment, an edge likelihood map $M_2 j \Sigma(m,n)$ is generated from the modulus images. An edge likelihood map is generated for each scale. At scale j, the edge likelihood map, $M_2 j \Sigma(m,n)$, is produced by adding all of the edge maps at that particular scale. The edge likelihood map, $M_2 j \Sigma(m,n)$, is generated using the following relationship:

$$M_2 j \Sigma(m,n) = M_2 j R(m,n) + M_2 j G(m,n) + M_2 j B(m,n).$$

In a preferred embodiment, two edge likelihood maps are generated, one edge likelihood map for the first scale (j=1) and a second edge likelihood map for the second scale (j=2), even if edge maps have been generated for more than two scales. In an alternate embodiment, distinct edge likelihood maps are generated for each scale, including scales greater than the j=2 scale. In another alternate embodiment, a single edge likelihood map is generated and applied to all scales.

A multiplicative mask, $k_2 j(m,n)$, is generated for at least one scale from the edge likelihood map $M_2 j \Sigma(m,n)$ at that same scale, and $k_2 j(m,n)$ represents the multiplicative mask for scale $S=2^j$. In FIG. 4, step 344, the values of the edge likelihood map are clipped using a scale-specific threshold or limiting value, $T_{2^j}$, to provide a clipped edge likelihood map.

In FIG. 4 step 346, the values of the clipped edge likelihood map are then scaled to a predetermined range of values to generate the multiplicative mask. In one embodiment, the predetermined range is the range of values from 0 to 1.0 for all scales. In an alternate embodiment, the predetermined range may vary from scale to scale. In the preferred embodiment, the multiplicative mask at each scale is generated by scaling the values of the clipped edge likelihood map to the predetermined range, zero to one using the following relationship:

$$k_{2j}(m,n) = \frac{{}^g T_{2j}(M_{2j} \Sigma(m, n))}{T_{2j}}, \text{ where } j = 1, 2.$$

The function "$g_{T_2}{}^j(\ )$" is the clipping function of step 344 of FIG. 4. In a preferred embodiment, the clipping function is $g_T(x) = \text{MIN}(x, T)$, where x is an input datum, and T is the clipping threshold.

In a preferred embodiment, multiplicative masks are generated and applied for the two finest scales of wavelet coefficients, that is, $S=2^1$ and $S=2^2$. Multiplicative masks at these two finest scales are preferred because the color component edges exhibit the greatest proportion of coincident edges at these scales. When edges coincide, their respective edge magnitudes reinforce each other and thus deliver large values in the corresponding edge likelihood map. Clipping the edge-likelihood maps serves to identify (leave a maximum masking value at) those locations having large edge likelihood and thus locates physically significant edges. The non-clipped values of the edge likelihood map provide a measure of the degree to which an edge is not physically meaningful.

In one implementation, a very small DC bias is added to edge likelihood maps prior to clipping to avoid producing zero-valued mask entries.

Alternately, multiplicative masks are generated for and applied to all scales of wavelet coefficients.

In an alternate embodiment, edge likelihood masks, and therefore the corresponding multiplicative masks, are generated from the edge maps for two distinct color channels rather than all color channels. In yet another alternate embodiment, a single multiplicative mask is generated for all color values and all scales.

In another preferred embodiment, the edge likelihood map is the aggregate modulus image, and the clipped edge likelihood map is the clipped-aggregate modulus image, as described in Chapter 5 of Appendix one.

Applying the Multiplicative Mask

Once the multiplicative masks, $k_{2^j}^1(m,n)$ and $k_{2^j}^2(m,n)$, are generated, noise edges are filtered as follows: the values of each edge map for a particular scale and color are multiplied by spatially corresponding values of the multiplicative mask for that particular scale and color. The filtering operation of the multiscale edge suppression technique of the present invention may be described using the following relationships:

$$M_{2^j}R'(m,n)=k_{2^j}(m,n)M_{2^j}R(m,n), j=1,2$$

$$M_{2^j}G'(m,n)=k_{2^j}(m,n)M_{2^j}G(m,n), j=1,2$$

$$M_{2^j}B'(m,n)=k_{2^j}(m,n)M_{2^j}B(m,n), j=1,2$$

In one embodiment, the same mask is applied, for each particular scale, to all of the modulus images at the particular scale regardless of the color channel. That is, the multiplicative masks are not color channel specific. The angle images are not filtered. In addition, the coarse image data, i.e. the LL channel for each scale, is not filtered.

In an alternate embodiment, the multiplicative masks are directly applied to the wavelet transform coefficients rather than to the modulus image or angle image values.

Selecting the Limiting Value

The multiplicative masks are a function of a scale-specific limiting value, $T_{2^j}$ for each edge likelihood map. The limiting values are chosen to favor image integrity over noise suppression, and therefore may be regarded as conservative estimates of optimal limiting values. In this embodiment, the limiting values may not yield the largest possible denoising performance as measured by the signal to noise ratio, never-the-less, effective denoising is achieved.

Selecting the limiting value involves tradeoffs. Large limiting values produce multiplicative masks with increased edge (and noise) suppression, but do so with an increased risk of suppressing physically significant edges. Smaller limiting values produce multiplicative masks that increase the likelihood of retaining physically significant edges, but with reduced noise suppression.

To select a particular limiting value, a histogram of each edge likelihood map, $M_{2^1}\Sigma(m,n)$, $M_{2^2}\Sigma(m,n)$ is generated. In one embodiment, the respective edge likelihood maps are based on the edge magnitude (modulus) images. The resulting histograms typically have a main lobe near the origin that, when moving away from the origin, drops off quickly from a peak value and leads to a long, nearly flat tail.

For image denoising, a threshold just to the right of the main lobe of the histogram is selected to retain large edge magnitude values while avoiding the inclusion of too many edges. Such a threshold can be determined by drawing a straight line along the right downward edge of the main lobe of the histogram. The x-coordinate of the point at which this line crosses the histogram's x-axis provides the desired threshold or limiting value.

In a preferred embodiment, to automatically determine the limiting value, an equation representing a straight line is determined by performing a least-squares fit through the data points falling along the right edge of the main lobe of a smoothed version of the histogram. The points to the right of the main lobe's peak value with y-coordinates falling between 10% and 90% of the histogram's largest value (the mode) are used in the least-squares calculation. The limiting value is equal to the point at which the resulting straight line intercepts the x-axis.

Although the generating of the multiplicative masks was described with respect to edge map magnitude values, in an alternate embodiment angle-based multiplicative masks are generated using edge likelihood maps derived entirely from angle image values. The angle-based multiplicative masks are applied to at least a subset of the original edge maps.

In an alternate embodiment, the angle-based multiplicative masks are used to modify magnitude values of the edge maps at each scale for which angle-based edge likelihood maps are generated. In one embodiment, the angle-based edge likelihood maps are generated in the same way as the magnitude-based edge likelihood maps. In another alternate embodiment, the magnitude-based multiplicative masks are applied to at least a subset of angle values of the edge maps to filter angle values.

In another alternate embodiment, a combinational multiplicative mask is generated from an edge likelihood map that is produced from a combination of magnitude and angle values. For example, a magnitude-based edge-likelihood map is generated from magnitude values as described above, and an angle-based edge-likelihood map is generated from angle values as described above. To generate a combinational edge likelihood map, the values of the angle-based edge-likelihood map are used to refine the values of the magnitude-based edge-likelihood map based on the corroboration of the information contained in the respective maps. If magnitude values and angle values at a corresponding location do not corroborate the existence of an edge at that location, the corresponding value in the magnitude-based edge likelihood map is reduced accordingly. In one embodiment, the corresponding value in the magnitude based edge likelihood map may be reduced to equal twenty-five percent of its original value. Angle values of an angle-based edge likelihood map corroborate the existence of an edge if the neighboring edge points in the same edge map exhibit similar angle values, that is, are pointing in the same direction. To generate an angle-based edge likelihood map, a set of neighboring edge points surrounding an edge point of interest is selected. The edge points in the set of neighboring edge points are determined to point in the same direction if the largest difference between all pairs of angle values associated with the edge points is less than or equal to a predefined angle similarity threshold. In one embodiment, the predfined angle similarity threshold is equal to twenty degrees. If all differences between the angle values of all the edge points in the set of neighboring edge points is less than or equal to the predefined angle similarity threshold, then the corresponding likelihood values for the edge point of interest in the angle-based edge likelihood map is set equal to 1.0, and otherwise is set equal to a predefined reduction value, such as 0.25. The combinational edge likelihood map is generated by computing the product of the angle-based edge likelihood map and the corresponding magnitude-based edge likelihood map to reinforce the edge likelihoods associated with strong edges and suppress the edge likelihoods associated with weak edges. The combinational edge likelihood map is applied to the modulus images using any of the embodiments described above.

In an alternate embodiment, the angle values from different color channels are used to create an angle-based edge likelihood map. In other words, the angle values for corresponding edge points of different color components are examined to determine whether the angle values for the edge point of interest point in the same or similar direction. When the difference between all pairs of angle values for the same edge point in different color channels is less than or equal to the predefined angle similarity threshold, then a corresponding value in the angle-based edge likelihood map is set equal to 1.0 because the likelihood of an edge is strong. When the difference between all pairs of angle values for the same edge point in different color channels is greater than the predefined angle similarity threshold, then a corresponding value in the angle-based edge likelihood map is set equal to a predefined partially-corroborating scale factor because the likelihood of an edge is weak. In one embodiment, the predefined partially-corroborating scale factor is set equal to 0.25. In one embodiment, to scale the value in the magnitude-based edge-likelihood map in order to produce a combinational edge likelihood map, the value in the magnitude-based edge-likelihood map is multiplied by the corresponding value in the angle-based edge likelihood map. The combinational edge likelihood map is applied to the modulus images using any of the embodiments described above.

In an alternate embodiment, when the difference between all pairs of angle values for the same edge point in different color channels is greater than the predefined angle similarity threshold, then a corresponding value in the angle-based edge likelihood map is set equal to zero.

Alternately, if a particular value in the magnitude-based edge-likelihood map is below a first threshold, which indicates a "weak" edge, the corresponding value in the angle-based edge-likelihood map is examined. Those sub-threshold values of the magnitude-based edge-likelihood map are adjusted or scaled based on corresponding values of the angle-based edge likelihood map.

Generating Wavelet Coefficients from Edge Maps

To generate the denoised sets of wavelet coefficients from the filtered edge maps, Mallat and Zhong's WTMM reconstruction technique, as taught by S. Mallat and S. Zhong in "Characterization of signals from multiscale edges," IEEE Transactions on Pattern and Machine Intelligence, vol. PAMI-14, pp. 710–732, July 1992, may be used.

In one implementation, the "wave2" software package developed by Mallat, Zhong et al. was used to perform the WTMM calculations described above. These calculations were carried out using four scales of analysis. The wave2 technique is available via anonymous login to ftp://cs.nyu.edu/pub/wave/wave2.tar.Z (Jun. 26, 1998). The wave2 reconstruction technique is described by S. Mallat and S. Zhong in "Characterization of signals from multiscale edges," IEEE Transactions on Pattern and Machine Intelligence, vol. PAMI-14, pp. 710–732, July 1992.

Generating the Denoised Color Image

The denoised color image is generated by applying an inverse wavelet transform to each of the denoised sets of wavelet coefficients. The inverse wavelet transform is in accordance with the particular wavelet transform that was used to initially generate the wavelet coefficients. One inverse wavelet transform that may be used in the present invention is described by S. Mallat and S. Zhong in "Characterization of signals from multiscale edges," IEEE Transactions on Pattern and Machine Intelligence, vol. PAMI-14, pp. 710–732, July 1992.

Extentions

Figure 9:
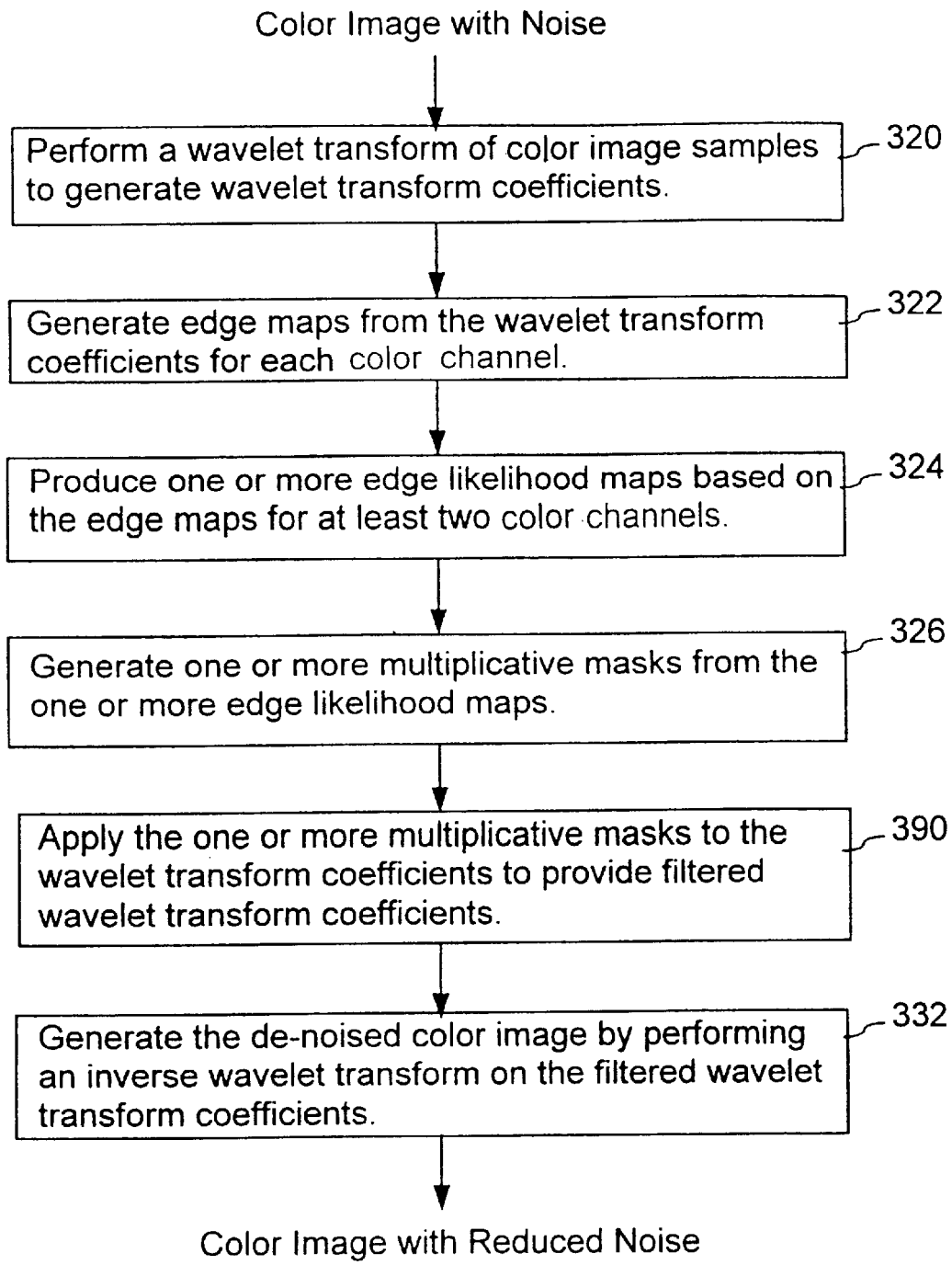
FIG. 9 is a flowchart of an alternate embodiment of the de-noise color image procedure that implements the method for removing noise from color images of FIG. 2.

FIG. 9 is a flowchart of another embodiment of the de-noise image procedure that implements the method for removing noise from color images of FIG. 2. FIG. 9 is the same as FIG. 3 except that step 390 of FIG. 9 applies the multiplicative mask directly to at least a subset of the wavelet transform coefficients to provide filtered wavelet transform coefficients, rather than applying the multiplicative mask for each color channel to the edge maps as shown in step 328 of FIG. 3. For example, the multiplicative mask of scale 1 is applied to the HL1 and LH1 subbands for all three color channels.

Component-separable Miltiscale Edge Suppression

Figure 10:
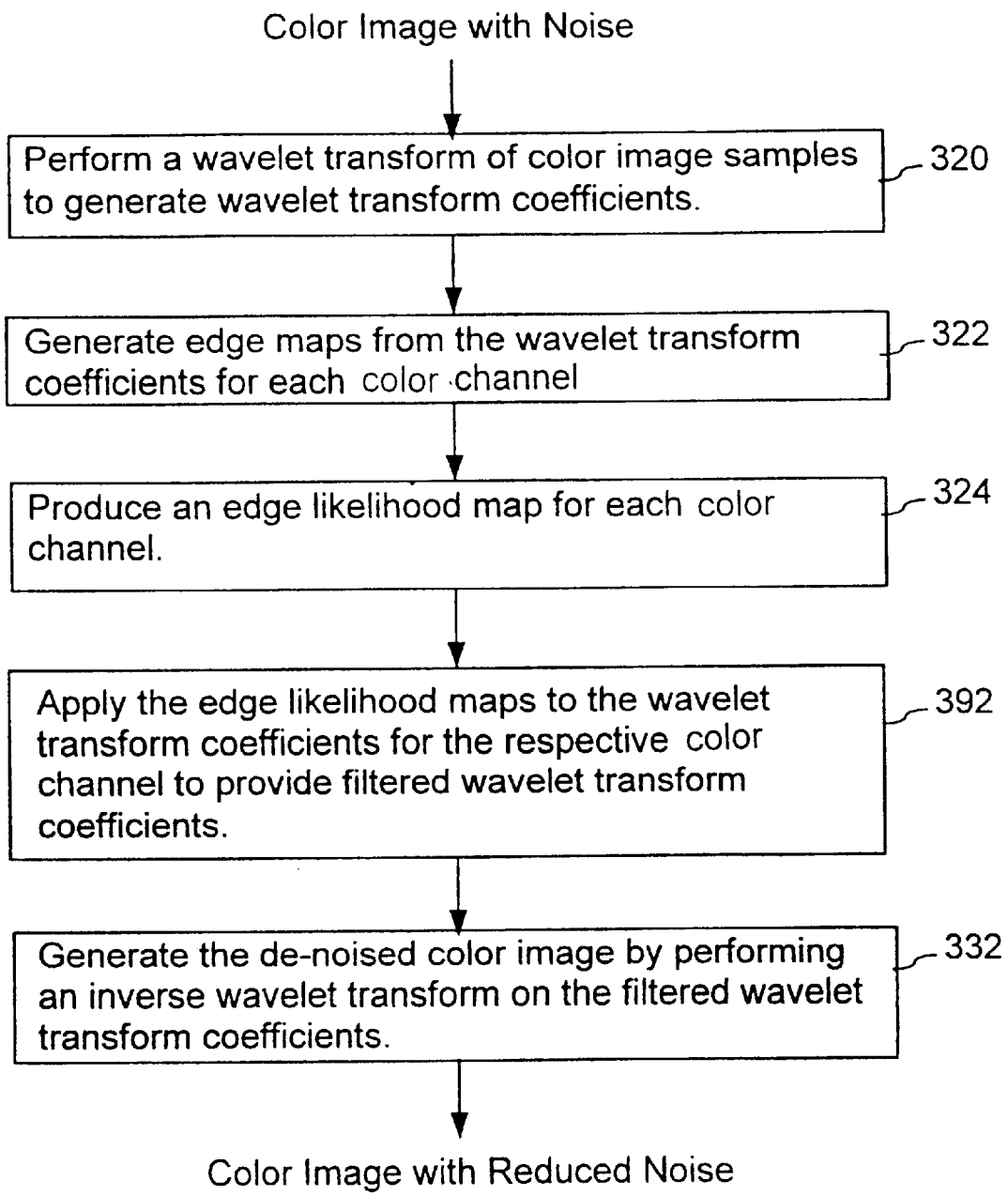
FIG. 10 is a flowchart of yet another alternate embodiment of the de-noise color image procedure that implements the method for removing noise from color images of FIG. 2.

FIG. 10 is a flowchart of yet another embodiment of the de-noise image procedure that implements the method for removing noise from color images of FIG. 2. The method of FIG. 10 is called "component-separable multi-scale edge suppression." In component-separable multi-scale edge suppression, each color image component or color channel is denoised independently of the other components. Steps 320, 322, 324, and 332 of FIG. 10 are the same as described with respect to FIG. 3.

The key difference between component-separable multi-scale edge suppression and the previous embodiments is that the edge likelihood maps, and therefore multiplicative masks, are derived from a single edge map rather than from a sum of the edge maps. In step 324 of FIG. 10, a separate edge likelihood map is generated for each color channel. These separate edge likelihood maps are then applied, separately, to each corresponding color channel in step 392 of FIG. 10.

In an alternate embodiment, based on the separate edge likelihood maps, separate multiplicative masks are generated for each color channel. The multiplicative masks are determined using the following relationships:

$$k^R_{2^j}(m,n) = \frac{{}^gT^R_{2^j}(M_{2^j}\Sigma(m,n))}{T^R_{2^j}}, j = 1, 2.$$

$$k^G_{2^j}(m,n) = \frac{{}^gT^G_{2^j}(M_{2^j}G(m,n))}{T^G_{2^j}}, j = 1, 2.$$

$$k^B_{2^j}(m,n) = \frac{{}^gT^B_{2^j}(M_{2^j}B(m,n))}{T^B_{2^j}}, j = 1, 2.$$

Note that the numerator of the above relationships contains the corresponding channel's edge likelihood map. Also, each color channel uses a color-channel-specific threshold. The thresholds are determined using the automated method described above.

In step 392, depending on the embodiment, the edge likelihood maps are applied to the wavelet transform coefficients for the respective color channel to provide filtered wavelet transform coefficients. For example, the edge likelihood map for the red channel at the first scale is applied to the wavelet coefficients of the red channel at the first scale.

Step 332 generates the denoised color image from the filtered wavelet transform coefficients as described above with respect to FIG. 3.

In an alternate embodiment of step 392, each multiplicative mask is applied to its respective edge map for that color channel and scale to generate filtered edge maps. For example, the multiplicative mask for the red channel at the first scale is applied to the edge map values of the red channel at the first scale. Steps 330 and 332 of FIG. 3 are then used to reconstruct the denoised color image.

Reference Image Based Multiscale Edge Suppression

Figure 11:
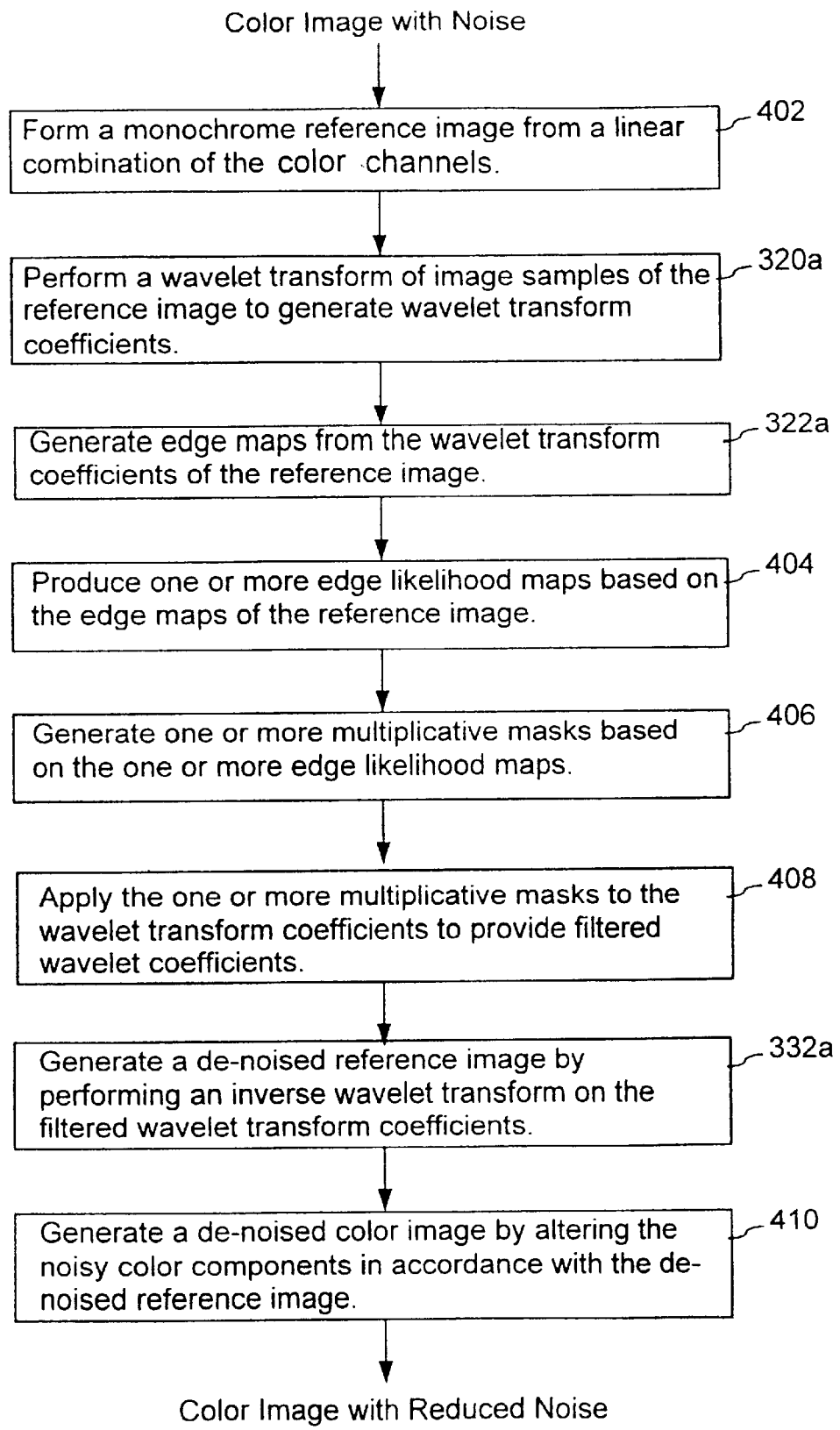
FIG. 11 is a flowchart of another alternate embodiment of the de-noise color image procedure that implements the method for removing noise from color images of FIG. 2.

In FIG. 11, another embodiment of multiscale edge suppression operates on a single channel reference image that has been computed from the noisy color image. This embodiment uses the same processing techniques described above, but only processes a single channel, the reference image. Steps that are similar to previously described steps will use similar reference numerals.

In step 402, a reference image is formed from a linear combination of the noisy color image channels. For example, a reference image that corresponds to luminance can be computed using NTSC weighting coefficients as follows:

$$L(m,n) = 0.299R(m,n) + 0.587G(m,n) + 0.114B(m,n).$$

In step 320a, a wavelet transform of image samples of the reference image is performed to generate wavelet transform coefficients. Step 320a of FIG. 11 is the same as step 320 of FIG. 3 except that the reference image of step 320a replaces the color image of step 320.

In step 322a, edge maps are generated from the wavelet transform coefficients of the reference image. Step 322a of FIG. 11 is the same as step 322 of FIG. 3 except that the edge maps are generated for the reference image rather than for each color channel. For example, if two scales are used, an edge map will be generated for each scale, and each edge map will include a modulus image and an angle image.

In step 404, after generating the multiscale edge maps, one or more edge likelihood maps, $M_{2^j}{}^L\Sigma(m,n)$, are generated using the following relationship:

$$M_{2^j}{}^L\Sigma(m,n) = M_{2^j}{}^L(m,n).$$

In this embodiment, the one or more modulus images that were generated for the reference image are used directly as edge likelihood maps. In an alternate embodiment, one or more edge likelihood maps are generated for the reference image based on a combination of the magnitude and angle values of the edge maps as described above.

In step 406, the multiplicative masks, $k_{2^j}{}^L(m,n)$, are generated from the one or more edge likelihood maps, $M_{2^j}{}^L(m,n)$, as follows:

$$k_{2^j}^L(m,n) = \frac{g T_{2^j}^L(M_{2^j}L(m,n))}{T_{2^j}^L}, \; j=1,2.$$

The limiting value $T_{2^j}{}^L$ is computed from $M_{2^j} L(m,n)$ using the automated approach described above. Clipping is performed using $g_T(x)=\text{MIN}(x,T)$.

In step 408, the multiplicative mask is applied directly to the wavelet transform coefficients of the reference image to provide filtered wavelet transform coefficients.

In step 332a, a denoised reference image is generated by performing an inverse wavelet transform on the filtered wavelet coefficients. Step 332a is the same as step 332 of FIG. 3. The denoised reference image is subsequently used to generate de-noised color component images.

In step 410, the de-noised color image is generated by altering the noisy color components in accordance with the denoised reference image. In one embodiment, based on color space transformations, a forward color space transformation is computed, the denoised reference image is substituted in for one of the components, and an inverse color space transformation is computed. This method is described in Section 4.3.2.1 of Appendix 1.

In an alternate embodiment, luminance masking is used to generate the denoised color image as described in Section 4.3.2.2 of Appendix 1.

Figure 12:
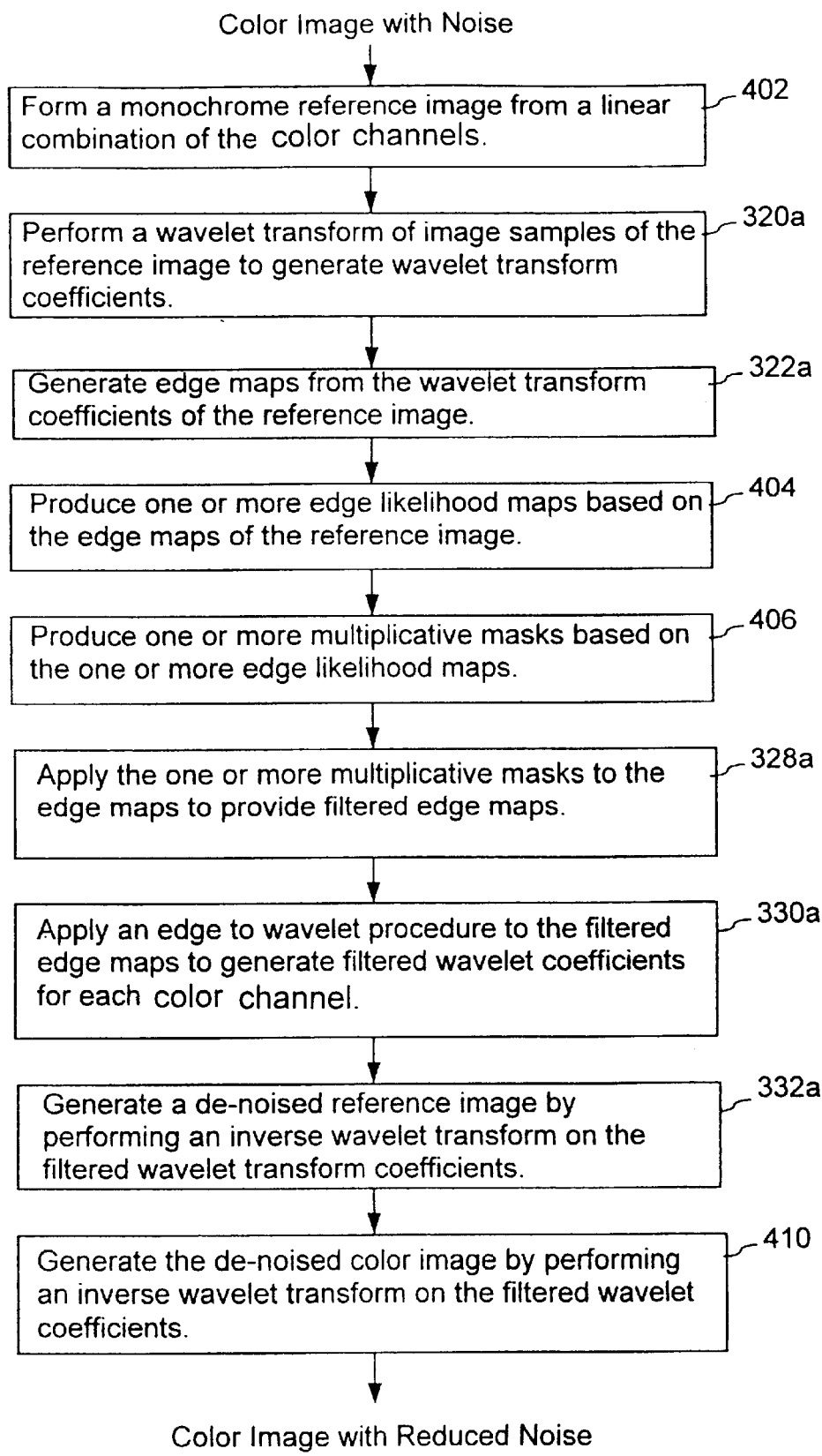
FIG. 12 is a flowchart of yet another alternate embodiment of the de-noise color image procedure that implements the method for removing noise from color images of FIG. 2.

FIG. 12 is a flowchart of yet another alternate embodiment of the de-noise image procedure that implements the method for removing noise from color images of FIG. 2. FIG. 12 is the same as FIG. 11 except that the multiplicative mask is applied to the edge maps rather than directly to the wavelet coefficients. Step 408 of FIG. 11 is replaced by steps 328a and 330a. Steps 328a and 330a are the same as steps 328 and 330, respectively, of FIG. 3.

In particular, in step 328a, after generating the multiplicative masks, the corresponding magnitude values of the edge maps for at least a subset of the scales, for instance $S=2^1$ and $S=2^2$, are multiplied by their respective multiplicative mask as follows:

$$M_{2^j}L'(m,n) = k_{2^j}{}^L(m,n) M_{2^j}L(m,n), \; j=1,2$$

The corresponding angle values of the edge maps and the coarse image data are not altered. The filtering operation that generates $M_{2^j}L'(m,n)$, described in the relationship above, produces sets of filtered edge map values that are used to produce filtered wavelet coefficients as described in step 330a of FIG. 12. Upon performing an inverse wavelet transform of these filtered wavelet coefficients, a denoised reference image, which in one embodiment is the denoised luma component, $L'(m,n)$, results.

Although the present invention has been described with respect to a computer system, the present invention may also be used in a digital camera, scanner and printer.

As described above, the present invention is implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Further details of the preferred embodiments are disclosed in the attached Appendix 1.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of removing noise from a color image, comprising:
    applying a wavelet transform to a color image to generate sets of wavelet transform coefficients for multiple color channels;
    producing edge maps for the multiple color channels from the sets of wavelet transform coefficients;
    generating a multiplicative mask based on at least two edge maps;
    applying the multiplicative mask to the sets of wavelet transform coefficients to generate sets of filtered wavelet transform coefficients; and
    reconstrucing a de-noised image from the sets of filtered wavelet transform coefficients.

2. The method of claim 1 wherein said generating generates the multiplicative mask based on at least two chromatically distinct edge maps.

3. The method of claim 1 wherein said generating generates the multiplicative mask based on at least two edge maps of differing scale.

4. The method of claim 1 wherein the edge maps include chromatically (i.e. color channel) distinct sets of edge maps; and said generating generates the multiplicative mask based on at least two chromatically (i.e. color channel) distinct sets of edge maps, each chromatically distinct set of edge maps including at least two edge maps of differing scale.

5. The method of claim 1 wherein the edge maps specify a location and magnitude of an edge associated with a pixel; and said generating generates the multiplicative mask based on the location and magnitude.

6. The method of claim 1 wherein the edge maps specify a location and angle of an edge associated with a pixel; and said generating generates the multiplictive mask based on the location and angle.

7. The method of claim 1 wherein the wavelet transform is an undecimated wavelet transform.

8. The method of claim 1 wherein the wavelet transform is a decimated wavelet transform.

9. The method of claim 1 wherein the multiple color channels include red, green and blue color values.

10. The method of claim 1 wherein the multiple color channels are color-space transformations of red, green and blue color values.

11. A method of removing noise from a color image, comprising;
   applying a wavelet transform to a color image to generate sets of wavelet transform coefficients for multiple color channels;
   producing edge maps for the multiple color channels from the sets of wavelet transform coefficients;
   generating a multiplicative mask based on at least two edge maps;
   applying the multiplicative mask to each edge map to generate filtered edge maps; and
   reconstructing a de-noised image from the filtered edge maps.

12. The method of claim 11 wherein said generating generates the multiplicative mask based on at least two chromatically distinct edge maps.

13. The method of claim 11 wherein said generating generates the multiplicative mask based on at least two edge maps of differing scale.

14. The method of claim 11 wherein the edge maps include chromatically distinct sets of edge maps, and said generating generates the multiplicative mask based on at least two chromatically distinct sets of edge maps, each chromatically distinct set of edge maps including at least two edge maps of differing scale.

15. The method of claim 11 wherein said generating the multiplicative mask includes adding all the edge maps associated with a predetermined scale.

16. The method of claim 11 wherein said generating the multiplicative mask includes adding at least two edge maps.

17. The method of claim 11 wherein said generating the multiplicative mask includes producing an edge likelihood map by combining at least two edge maps, the multiplicative mask being generated based on the edge likelihood map.

18. The method of claim 17 further comprising scaling the edge likelihood map to generate the multiplicative mask.

19. The method of claim 17 further comprising:
   limiting values of the edge likelihood map that exceed a first predetermined value to a second predetermined value to generate the multiplicative mask.

20. The method of claim 19 wherein said scaling includes scaling the edge likelihood map.

21. The method of claim 19 wherein said first predetermined value is equal to the second predetermined value.

22. The method of claim 19, further comprising:
   generating a histogram of the edge likelihood map; and
   determining the first predetermined value based on the histogram.

23. The method of claim 17 wherein the edge maps include descriptors of the size and location of edges for the color channel, wherein said producing the edge likelihood map is based on the descriptors of the size and location of edges of at least two edge maps.

24. The method of claim 17 wherein the edge maps include descriptors of the location and angle of edges for the color channel, wherein said producing the edge likelihood map is based on the descriptors of the location and angle of edges of at least two edge maps.

25. The method of claim 11 wherein the wavelet transform is an undecimated wavelet transform.

26. The method of claim 11 wherein the wavelet transform is a decimated transform.

27. The method of claim 11 wherein said reconstructing includes:
   generating a set of wavelet transform reconstruction coefficients for each filtered edge map; and
   applying an inverse wavelet transform to each set of wavelet transform reconstruction coefficients to generate the de-noised color image.

28. The method of claim 11 wherein the multiple color channels are red, green and blue color values.

29. The method of claim 11 wherein the multiple color channels are luminance, saturation and hue values.

30. The method of claim 11 wherein the multiple color channels are color-space transformations of red, green and blue color values.

31. A computer program product for use in conjunction with a computer system, the computer program product comprising a computer readable storage medium and a computer program mechanism embedded therein, the computer program mechanism comprising:
   a wavelet transform procedure that is applied to color image data to generate sets of wavelet transform coefficients for multiple color channels;
   an edge detector procedure that produces edge maps for the multiple color channels from the sets of wavelet transform coefficients;
   instructions that generate a multiplicative mask based on at least two edge maps; instructions that multiply the edge maps by the multiplicative mask to produce filtered edge maps; and
   instructions that reconstruct a de-noised image from the filtered edge maps.

32. A method of removing noise from a color image, comprising:
   applying a wavelet transform to a color image to generate sets of wavelet transform coefficients for multiple channels;
   producing edge maps for the channels from the sets of wavelet transform coefficients;
   generating an edge likelihood map based on at least one edge map;
   applying the edge likelihood map to the sets of wavelet transform coefficients to generate sets of filtered wavelet transform coefficients; and
   reconstructing a de-noised color image from the sets of filtered wavelet transform coefficients.

33. The method of claim 32 wherein the channels include luminance values, one of the edge maps is associated with the luminance values, and the edge likelihood map is based on the edge map associated with the luminance values.

34. A method of removing noise from a color image, comprising:
   applying a wavelet transform to a color image to generate sets of wavelet transform coefficients for multiple color channels;
   producing edge maps for the color channels from the sets of wavelet transform coefficients;
   generating an edge likelihood map for each color channel based on the edge maps;
   applying the edge likelihood maps to the sets of wavelet transform coefficients associated with the respective color channels to generate sets of filtered wavelet transform coefficients; and
   reconstructing a de-noised color image from the sets of filtered wavelet transform coefficients.

35. A method of removing noise from a color image, comprising:
   applying a wavelet transform to a color image to generate sets of wavelet transform coefficients for multiple color channels;

producing edge maps for the color channels from the sets of wavelet transform coefficients;

generating an edge likelihood map based on the edge maps; proportionally applying the edge likelihood map to the sets of wavelet transform coefficients in accordance with a contribution of a respective color channel to the edge likehood map to generate sets of filtered wavelet transform coefficients; and reconstructing a de-noised color image from the sets of filtered wavelet transform coefficients.

* * * * *